(12) United States Patent
Williams

(10) Patent No.: US 9,063,630 B2
(45) Date of Patent: Jun. 23, 2015

(54) SINGLE AXIS ZOOM

(75) Inventor: Oliver M. C. Williams, San Francisco, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1277 days.

(21) Appl. No.: 12/500,629

(22) Filed: Jul. 10, 2009

(65) Prior Publication Data

US 2011/0007097 A1 Jan. 13, 2011

(51) Int. Cl.
*G09G 5/00* (2006.01)
*G06F 3/0484* (2013.01)
*G06F 3/0481* (2013.01)

(52) U.S. Cl.
CPC .... *G06F 3/0481* (2013.01); *G06F 2203/04806* (2013.01)

(58) Field of Classification Search
CPC ............... G06F 2203/04806; G06F 3/04845
USPC .......................................... 345/661, 663, 665
See application file for complete search history.

(56) References Cited

U.S. PATENT DOCUMENTS

| | | | |
|---|---|---|---|
| 4,755,811 A * | 7/1988 | Slavin et al. | 345/668 |
| 6,229,536 B1 * | 5/2001 | Alexander et al. | 345/440.1 |
| 6,642,936 B1 | 11/2003 | Engholm et al. | |
| 2004/0250216 A1 | 12/2004 | Roman et al. | |
| 2005/0168353 A1 | 8/2005 | Dement et al. | |
| 2007/0198941 A1 | 8/2007 | Baar et al. | |
| 2007/0244990 A1 | 10/2007 | Wells | |
| 2009/0055719 A1 | 2/2009 | Cossins et al. | |

OTHER PUBLICATIONS

PicoScope Support answer and questions for Time zooming on Mon Feb. 26, 2007 webpage, http://www.picotech.com/support/topic3293.html, downloaded Jul. 3, 2012, 2 pages.*
"Exploratory data analysis", retrieved at <<http://en.wikipedia.org/wiki/Exploratory_data_analysis>>, May 15, 2009, pp. 4.
Dean, et al., "Discovering Essential Acrobat Information", retrieved at <<http://media.wiley.com/product_data/excerpt/91/04701209/0470120991.pdf>>, John Wiley and Sons Ltd, Aug. 2007, pp. 795-802.
Shneiderman, Ben, "Supporting Creativity with Advanced Information-Abundant User Interfaces", retrieved at <<http://citeseerx.ist.psu.edu/viewdoc/download?doi=10.1.1.39.5213&rep=rep1&type=pdf>>, HCIL Technical Report No. 99-16, Jul. 1999, pp. 1-15.
"Chisio User's Guide," retrieved at<<http://www.cs.bilkent.edu.tr/~ivis/chisio/Chisio-1.0-UG.pdf, i-Vis Information Visualization Research Group, Version 1.0, Computer Engineering Department, Bilkent University, Jun. 2007, 33 pages.
"Using the School District Data Site," retrieved at http://www.uwsa.edu/edi/precollege/data/Using_the_School_District_Data_Site.pdf on May 14, 2009, 5 pages.

* cited by examiner

*Primary Examiner* — Jeffery A Brier
(74) *Attorney, Agent, or Firm* — Micah Goldsmith; Judy Yee; Micky Minhas

(57) ABSTRACT

A graphical representation of data may be displayed along with a horizontal axis and a vertical axis. A user may define a region in the graphical representation using a zoom tool. If the defined region intersects with either of the horizontal or vertical axes, a single axis zoom may be performed according to the defined region rather than a conventional zoom. A single axis zoom may include maintaining the domain of either the horizontal or vertical axes, while zooming in at the intersected axis of the defined region.

11 Claims, 10 Drawing Sheets

SINGLE AXIS ZOOM

BACKGROUND

Many applications for analyzing data provide the facility to graph data against horizontal and vertical axes. In addition, many of these applications offer the facility for the user to "zoom in" to a particular region of the data by drawing a box around some of the data. This feature is sometimes referred to as a "marquee zoom." For example, a user may draw a box around a section of the plotted data. The application may then "zoom in" to the data by redefining the domain and range of the plot that are viewable on the screen to the domain and range of the drawn box.

Often, a user may want to zoom along just one axis of the plot (e.g., to focus on a few values on the vertical axis but maintain the full range of values on the horizontal axis). In a standard marquee zoom this would necessitate the user to accurately draw a long thin rectangle, which is difficult and likely to miss some of the data that the user is interested in viewing.

SUMMARY

A graphical representation of data may be displayed along with a horizontal axis and a vertical axis. A user may define a region in the graphical representation using a zoom tool. If the defined region intersects with either of the horizontal or vertical axes, a single axis zoom may be performed according to the defined region rather than a conventional marquee zoom. A single axis zoom may be performed by maintaining the dimensions of either the horizontal or vertical axes, while zooming in at the intersected axis according to one dimension of the defined region.

In an implementation, a first graphical representation of data may be displayed. The first graphical representation may have a first domain and a first range. An indication of a selection may be received. The indication of a selection may define a region within the first graphical representation and may have a second domain and a second range. A determination may be made whether to implement either a horizontal or vertical single axis zoom. If it is determined to implement a vertical single axis zoom, a second graphical representation of the data may be displayed. The second graphical representation may have a domain that is equal to the first domain, and a range that is equal to the second range. If it is determined to implement a horizontal single axis zoom, a second graphical representation of the data may be displayed. The second graphical representation may have a domain that is equal to the second domain, and a range that is equal to the first range. The determination of whether to implement either the horizontal or vertical single axis zoom may be based on a received indication to implement either the horizontal or vertical single axis zoom. The indication to implement may be a keystroke or a mouse gesture, for example.

In an implementation, a first graphical representation of data may be displayed. The first graphical representation may have a first domain and a first range, and may have a horizontal axis and a vertical axis. An indication of a selection may be received. The indication of a selection may define a region within the first graphical representation. The region may have a second domain and a second range. A determination may be made as to whether the defined region overlaps with either the horizontal axis or the vertical axis. If it is determined that the defined region overlaps with the vertical axis, a second graphical representation of the data may be displayed. The second graphical representation may have a domain that is equal to the first domain, and a range that is equal to the second range. If it is determined that the defined region overlaps with the horizontal axis, a second graphical representation of the data may be displayed. The second graphical representation may have a domain that is equal to the second domain, and a range that is equal to the first range. The indication of a selection may be an indication of a marquee selection. The data may be image data or video data.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
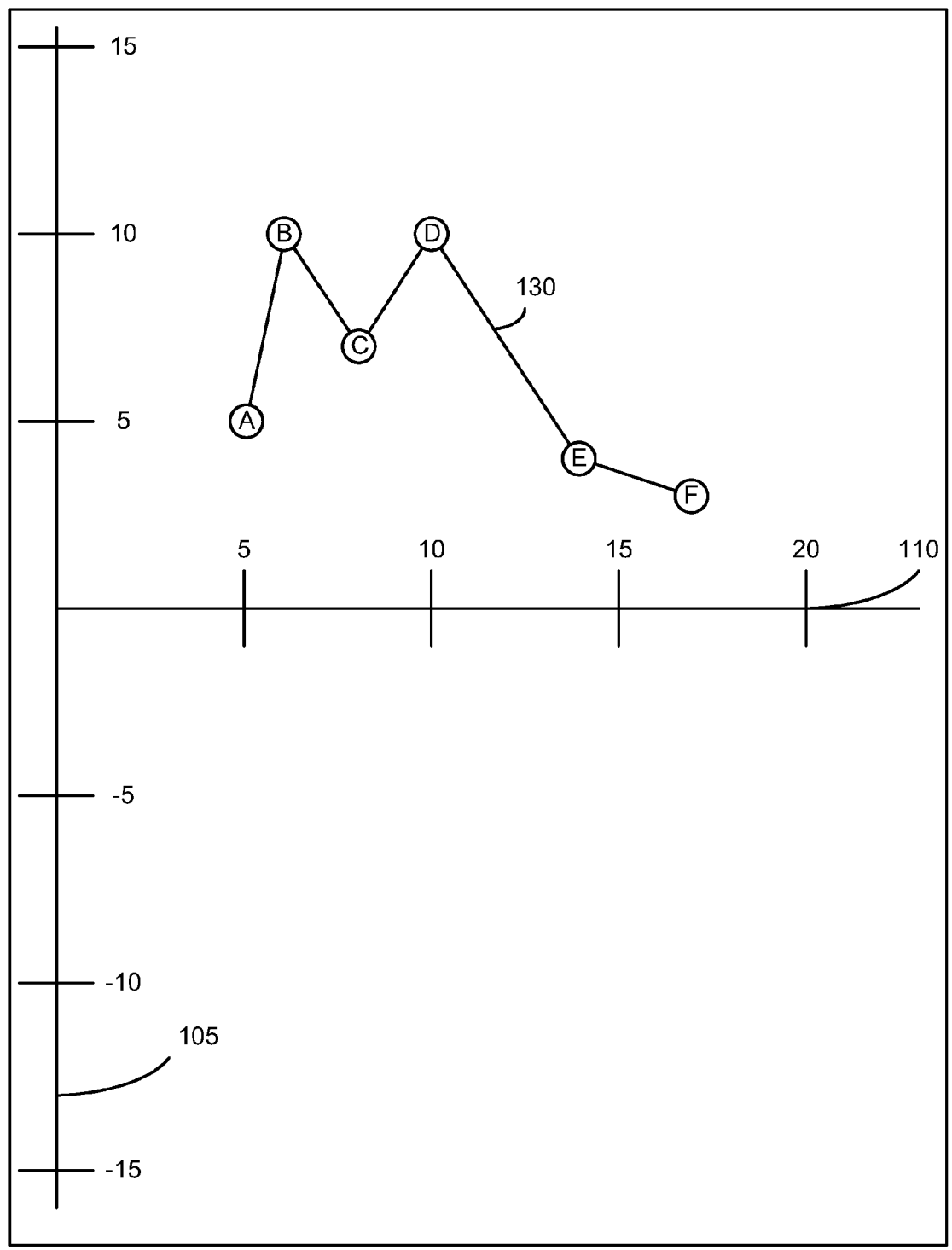
FIG. 1 is an illustration of an exemplary screen shot of a user interface for providing single axis zoom functionality.

FIG. 1 is an illustration of an exemplary screen shot 100 of a user interface for providing single axis zoom functionality. In some implementations, the single axis zoom functionality may allow a user to zoom in on a graphical representation of data by defining a box in the region of the graphical representation that the user would like to zoom in on. However, rather than displaying a new graphical representation of the data with the boundaries defined by the defined box, the single axis zoom functionality maintains either the horizontal or vertical boundaries of displayed data.

The user interface may be adapted to display a graphical representation of data. As illustrated, the user interface is displaying a graphical representation of data comprising data points A-F plotted against a horizontal axis 110 and a vertical axis 105. The vertical axis 105 has a range from −15 to 15. The horizontal axis has a range from 0 to 20. The user interface further includes a graph 130 of the data points A-F.

While the user interface is shown in the screen shot 100 as displaying data including a set of data points plotted against the horizontal axis 110 and the vertical axis 105, it is for illustrative purposes only; the user interface may display graphical representations of a variety of data and data types. For example, the user interface may display data representing images or videos. Other types of data may also be displayed.

Figure 2:
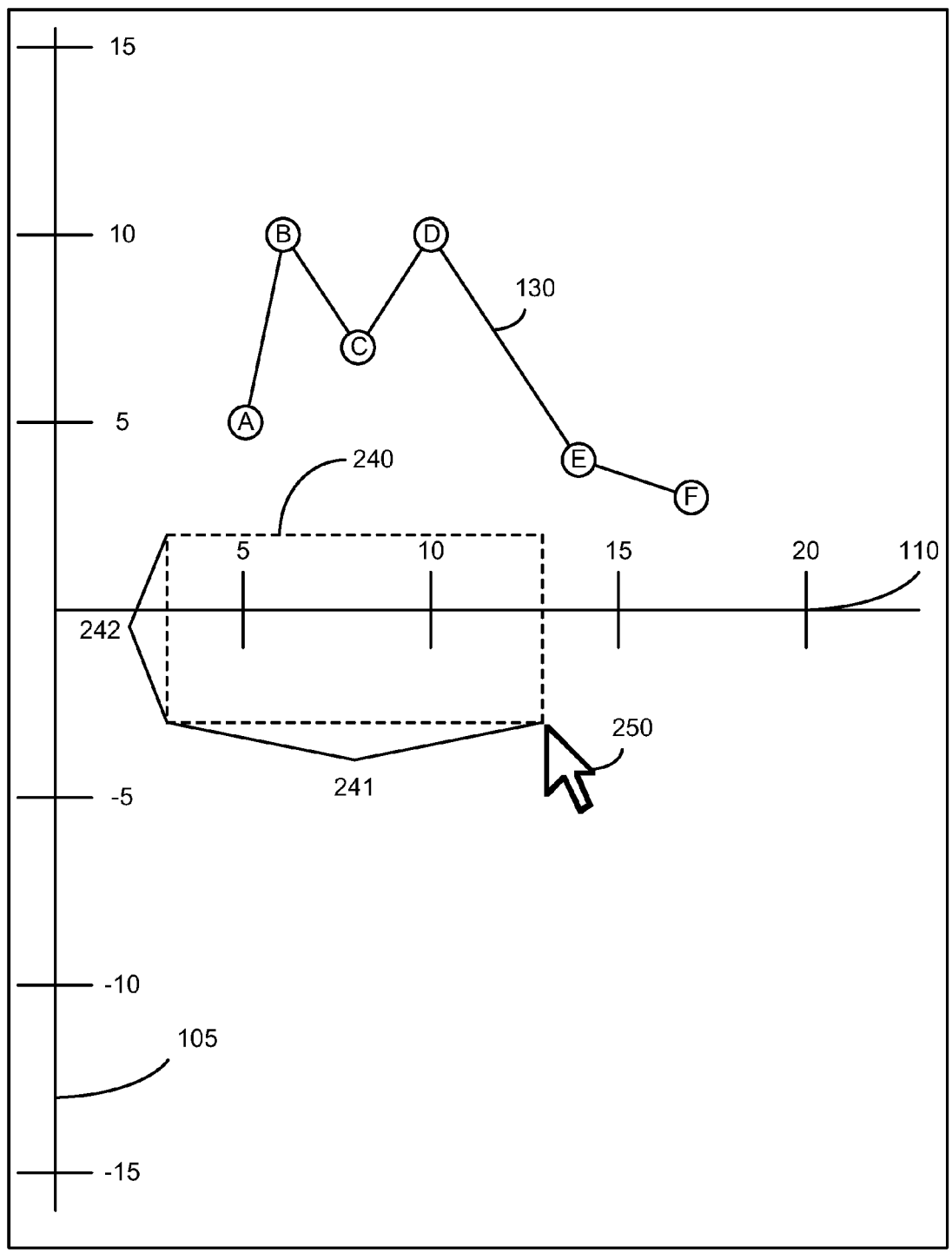
FIG. 2 is an illustration of another exemplary screen shot of a user interface for providing single axis zoom functionality.

FIG. 2 is an illustration of an exemplary screen shot 200 of a user interface for providing single axis zoom functionality. The screen shot 200 is another screen shot of the user interface described previously with respect to FIG. 1. In the screen shot 200, a user may interact with the graphical representation of the data using a user interface element 250. The location (e.g., the positioning) of the user interface element 250 may be controlled by the user using a mouse or other input device. In the example shown, the user interface element 250 is in the form of a pointer icon. However, other icons may also be used to represent the user interface element 250.

As illustrated, the user interface element 250 has defined a region 240 in the user interface. The region 240 has a domain 241 of approximately 3 to 12, and a range 242 of approximately −4 to 2.

For example, the user may wish to zoom in on a portion of the graph 130. In particular, the user may wish to zoom in on a portion of the graph 130 corresponding to the domain 241. In addition, the user may wish to continue to view the graph 130 using the range currently used to display the graph 130.

Accordingly, the user has provided an indication to perform a single axis zoom on the horizontal axis whereby the existing range of the vertical axis 105 is maintained and the domain of the horizontal axis 110 of the graphical representation is updated to the domain 241 of the defined region 240. In some implementations, the indication is that the region 240 overlaps with the horizontal axis 110. For example, the user interface may determine that the region 240 overlaps with the horizontal axis 110 and interpret the overlap as an indication to perform a single axis zoom in on the graphical representation as indicated by the domain 241 while keeping the range fixed to the current range of the vertical axis 105.

Had the region 240 been defined to overlap with the vertical axis 105, rather than the horizontal axis 110, the user interface may have interpreted the overlap as an indication to perform a single axis zoom on the vertical axis 105 whereby the existing domain of the horizontal axis 110 is maintained and the range of the vertical axis 105 of the graphical representation is updated to the range 242 of the defined region 240.

Other indications to perform a single axis zoom may be used besides, or in addition to, the region 240 overlapping one of the axes 110 or 105. For example, the indication may be a key or mouse button actuated while drawing the region 240, may be a command spoken by the user or may be a finger (e.g., touch) or a mouse gesture. Any type of indication known in the art may be used.

Figure 3:
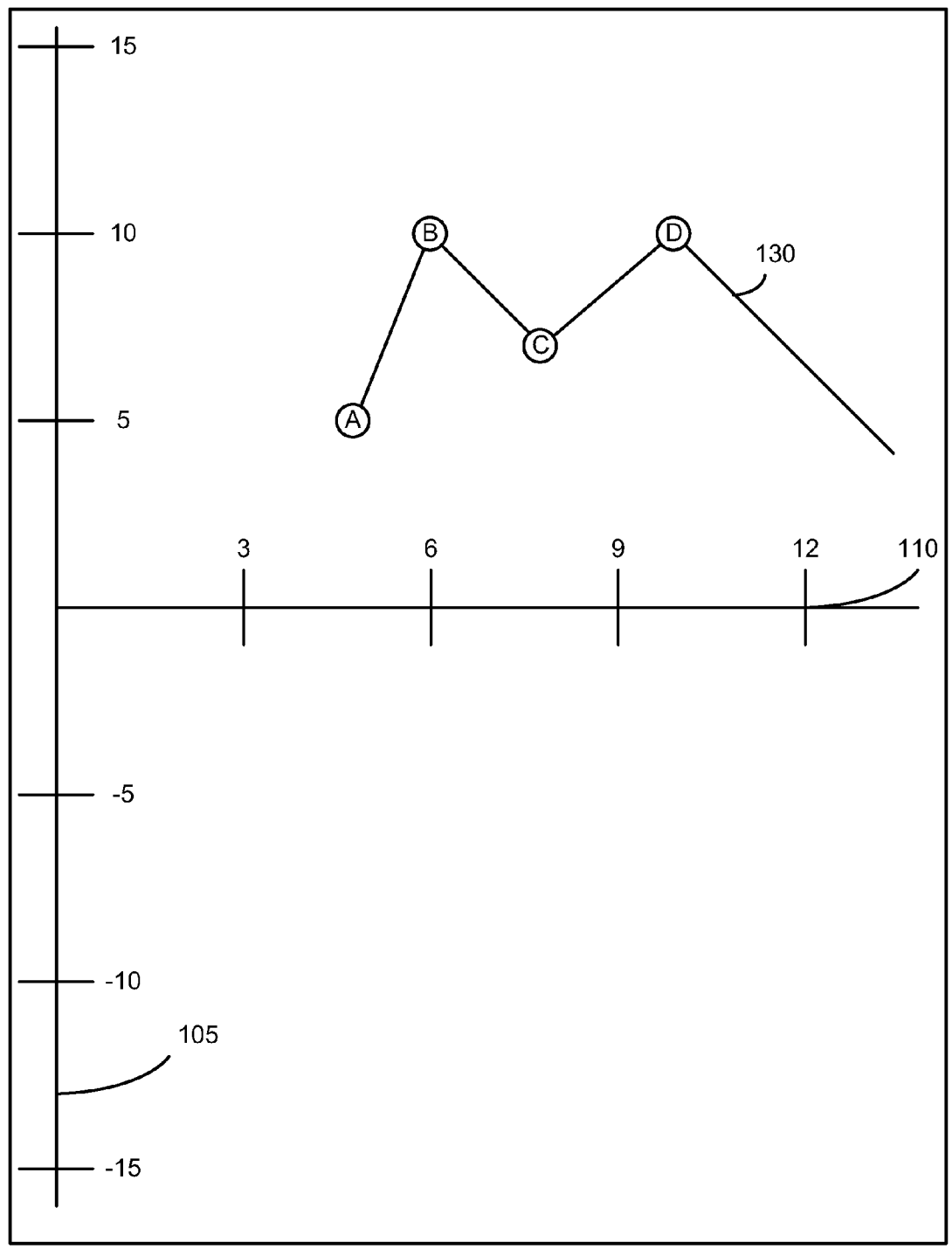
FIG. 3 is an illustration of another exemplary screen shot of a user interface for providing single axis zoom functionality.

FIG. 3 is an illustration of an exemplary screen shot 300 of a user interface for providing single axis zoom functionality. In particular, the screen shot 300 is of a user interface displaying a graphical representation of data after performing a single axis zoom according to the example described with respect to the screen shot 200 of FIG. 2.

As illustrated, the horizontal axis 110 has been resized to have a domain approximately equal to the domain 241 of the region 240. Because the region 240 overlapped with the horizontal axis 110, a single axis zoom on the horizontal axis 110 has been performed and the range of the vertical axis 105 remains unchanged from the screen shot 200. For example, the domain of the horizontal axis 110 is now approximately 3 to 12, corresponding to the domain 241 of the region 240. The range of the vertical axis 105 remains at −15 to 15.

Further, the graphical representation of the data has been resized to account for the new domain of the horizontal axis 110. As illustrated the data points A, B, C, and D, and the corresponding graph 130, have been rescaled according to the new domain of the horizontal axis 110. Data points E and F are no longer illustrated in the graph 130 because they lay outside of the new domain of the horizontal axis 110.

Figure 4:
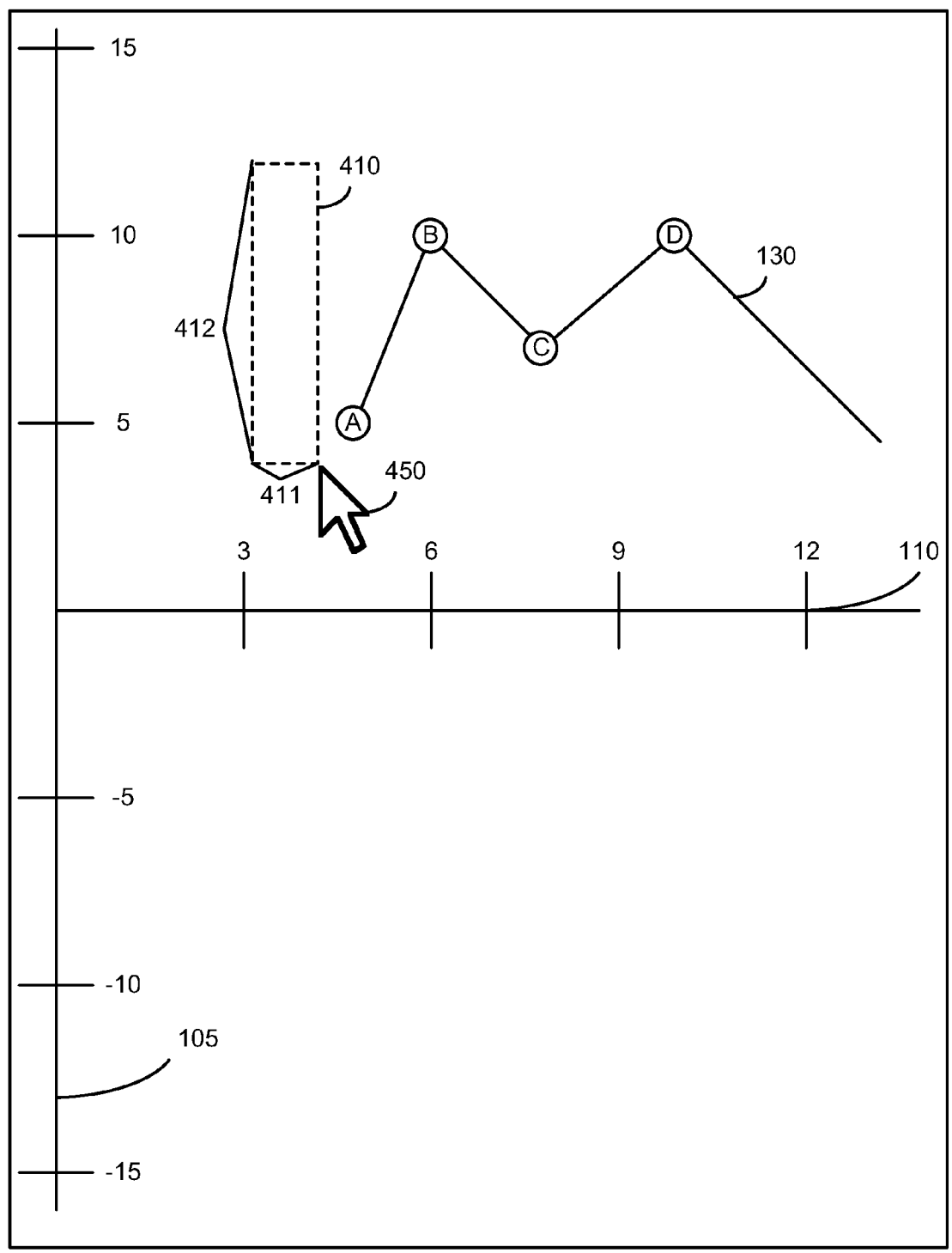
FIG. 4 is an illustration of another exemplary screen shot of a user interface for providing single axis zoom functionality.

FIG. 4 is an illustration of an exemplary screen shot 400 of a user interface for providing single axis zoom functionality. In the screen shot 400, the displayed graphical representation has the same domain and range as the graphical representation illustrated in the screen shot 300.

As illustrated, a user has defined a region 410 in the graphical representation using a user interface element 450. The user interface element 450 may be similar to the user interface element 250 illustrated with respect to FIG. 2, for example.

The defined region 410 may have a domain 411 and a range 412. The domain 411 may be approximately from 3 to 4, and the range 412 may be approximately 4 to 12, for example.

Similarly to the example described with respect to FIGS. 2 and 3, a user may perform a single axis zoom on the graphical representation of the data. In the example shown, the user may desire to perform a single axis zoom on the vertical axis 105. Thus, the user desires that a graphical representation of the data having a range approximately equal to the range 412 of the region 410, and a domain approximately equal to the domain of the horizontal axis 110, be displayed.

In contrast with the single axis zoom described with respect to FIGS. 2 and 3, the user has not provided an indication that the user desires a single axis zoom by defining the region 450 to overlap either of the vertical axis 105 or the horizontal axis 110. Instead the user may provide the indication by actuating a button on a keyboard or mouse. For example, while defining the region 410, the user may actuate the "v" key on a keyboard to indicate the user desires a single axis zoom on the vertical axis 105 using the range 412 of the defined region 410. Other indications may also be used.

Figure 5:
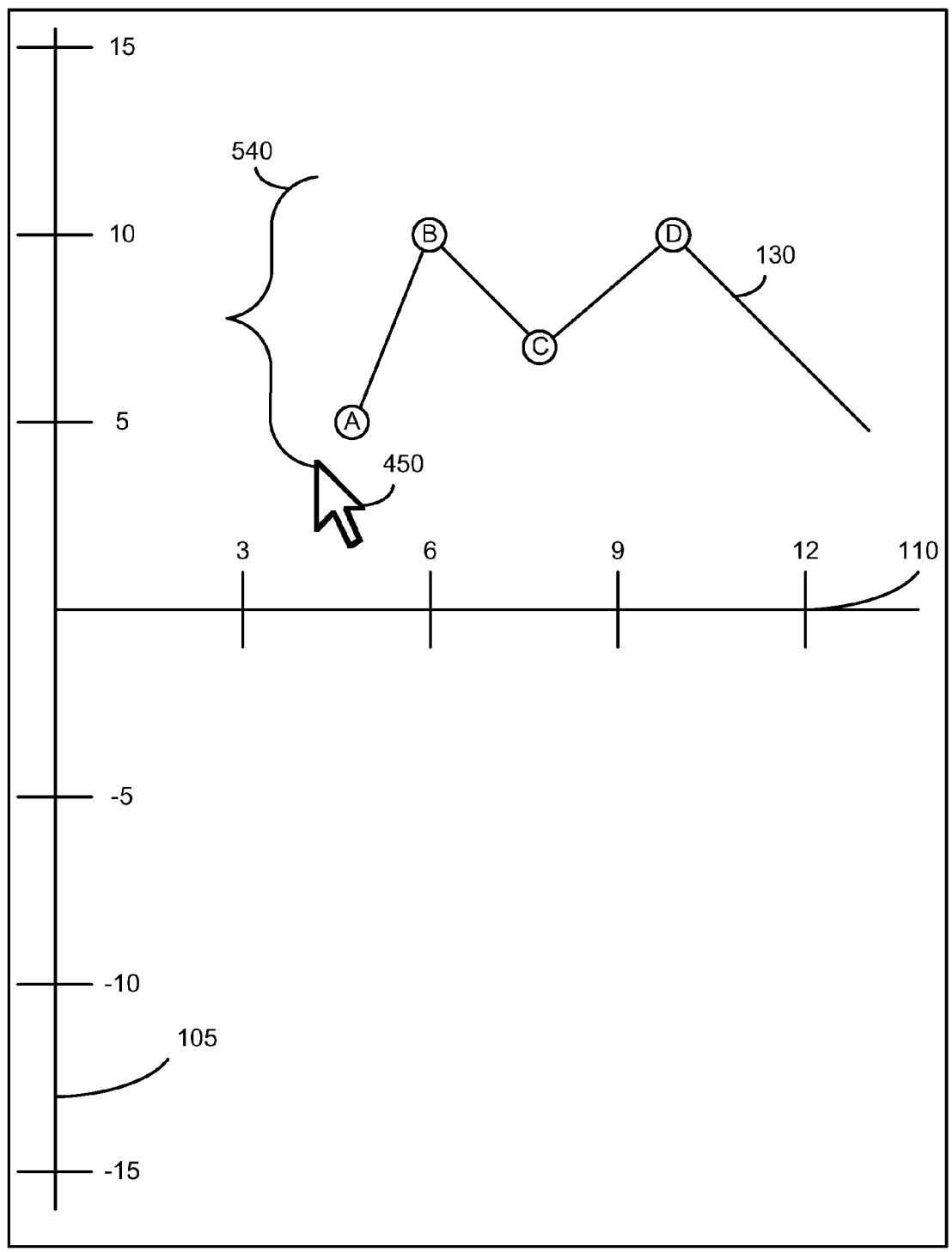
FIG. 5 is an illustration of another exemplary screen shot of a user interface for providing single axis zoom functionality.

FIG. 5 is an illustration of an exemplary screen shot 500 of a user interface for providing single axis zoom functionality. Continuing the example described with respect to FIG. 4, a user has used user interface element 450 to define a region 410 corresponding to a desired single axis zoom. In addition, the user may have provided the user interface with an indication that the user desires a single axis zoom on the vertical axis 105, rather than a typical box or marquee zoom. For example, the user may have actuated the "v" key on a keyboard.

In order to indicate to the user that a single axis zoom will be performed, the box defining the region 410 may be replaced with a calipers graphic 540. As illustrated, in the example, the calipers graphic 540 may indicate that a single axis zoom will be performed on the graphical representation with a range of approximately 4 to 12. Other graphics or visual indicators may be used to indicate to the user that a single axis zoom has been selected. For example, rather than replace the dashed box of the region 410 with the calipers graphic 540, the dashed box may change colors. Alternatively, or additionally, the desired axis may be highlighted to indicate the single axis zoom. In other implementations, a sound may be played to indicate a single axis zoom. Any system, method, or technique for providing an indication to a user may be used.

Figure 6:
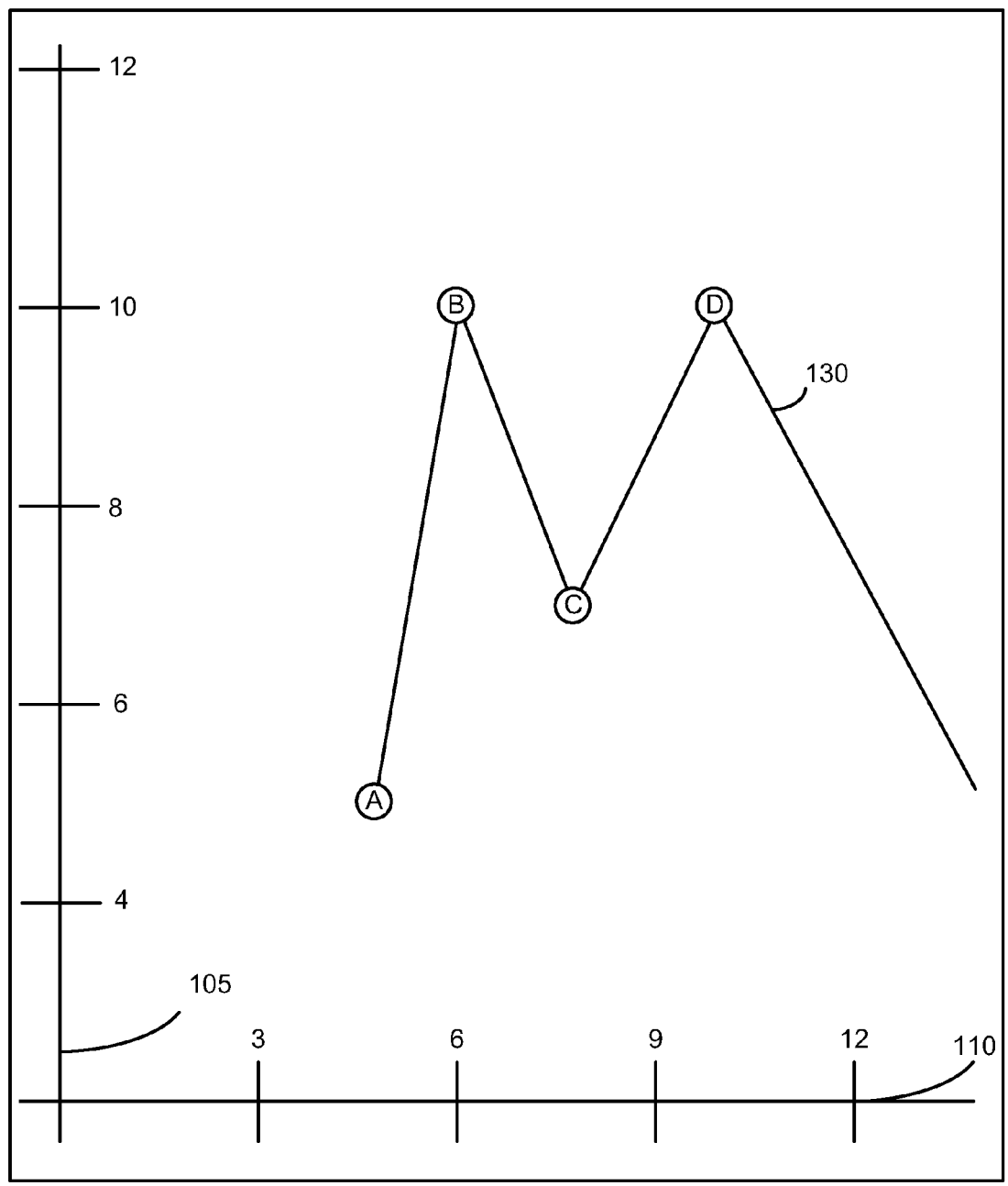
FIG. 6 is an illustration of another exemplary screen shot of a user interface for providing single axis zoom functionality.

FIG. 6 is an illustration of an exemplary screen shot 600 of a user interface for providing single axis zoom functionality. Continuing the example described with respect to FIGS. 4 and 5, a user has performed a single axis zoom on the vertical axis 105 with a range 412 of approximately 4 to 12. Accordingly, the screen shot 600 reflects a change in the range of the vertical axis 105 to approximately 4 to 12, while the domain of the horizontal axis 110 remains the same as the horizontal axis 110 illustrated in FIG. 5. Similarly, the graph 130 and data points A-D have been redrawn to account for the new range of the vertical axis 105.

Figure 7:
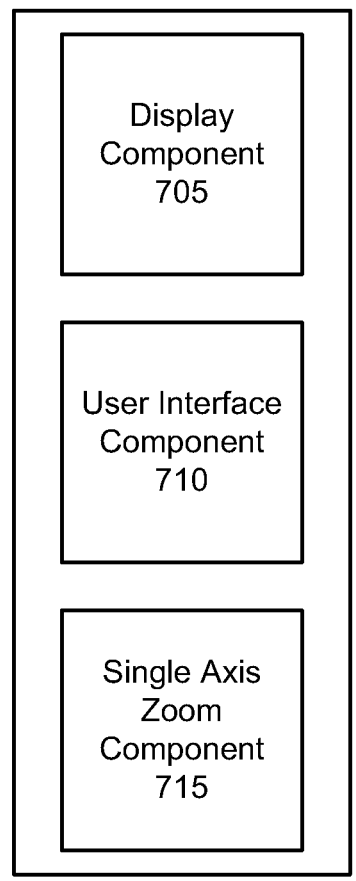
FIG. 7 is an illustration of an exemplary system for providing single axis zoom functionality.

FIG. 7 is an illustration of an exemplary system 700 for implementing single axis zoom functionality. The system 700 may be implemented using one or more of the exemplary computing devices 1000 described with respect to FIG. 10, for example.

The system 700 may include a display component 705. The display component 705 may be adapted to display a graphical representation of data. The data may include image data or video data, for example. However, any type of data may be displayed by the display component 705.

In some implementations, the graphical representation of the data may have an associated range and domain. For example, the domain may correspond to the width of the graphical representation, and the range may correspond to a height of the graphical representation. In addition, the graphical representation may include a horizontal axis and a vertical axis. The horizontal axis may have a domain corresponding to the domain of the graphical representation and the vertical axis may have a range corresponding to the range of the graphical representation. The data may be plotted or displayed within the graphical representation relative to the horizontal and vertical axes.

Examples of the graphical representations of data displayed by the display component 705 are illustrated in the screen shots 100-600 shown in FIGS. 1-6, respectively.

The system 700 may further include a user interface component 710. The user interface component 710 may be adapted to receive an indication of a selection. The indication of a selection may be received from a user through a selection device such as a keyboard, mouse, track pad, touch screen, or other selection device.

Typically, the indication of a selection defines a region within the graphical representation displayed by the display component 705. The defined region may have a domain and range. The indication of a selection may be a box selection or marquee selection such as the selections shown by user interface elements 250 and 450 illustrated in FIGS. 2 and 4, respectively.

The user interface component 710 may be further adapted to receive an indication to implement a single axis zoom. The indication to implement a single axis zoom may be received from a user and may indicate that a user wants to perform a single axis zoom along one axis or dimension corresponding to a defined region. For example, the user may actuate a key or other input to indicate that the user wants to perform a single axis zoom on the horizontal axis while leaving the vertical axis unchanged.

The user interface component 710 may be further adapted to generate an indication that a single axis zoom has been selected. The user interface component 710 may instruct the display component 705 to provide a graphical indication to the user that a single axis zoom has been selected. For example, the user interface component 710 may instruct the display component 705 to display a calipers graphic 540 as illustrated in FIG. 5. Other indications may also be provided.

The system 700 may further include a single axis zoom component 715. The single axis zoom component 715 may determine if an axis zoom has been selected and if so, instruct the display component 705 to display a graphical representation of the data with either a domain or a range corresponding to the indication of a selection.

In one implementation, the single axis zoom component 715 may determine if the region defined by the indication of a selection overlaps with either the horizontal axis or the vertical axis. If the single axis zoom component 715 determines that the defined region overlaps with the horizontal axis, the single axis zoom component 715 may determine that a single axis zoom on the horizontal axis is requested and may instruct the display component 705 to display a graphical representation of the data with the domain associated with the defined region, and a range that is unchanged from the current graphical representation. Similarly, if the single axis zoom component 715 determines that the defined region overlaps with the vertical axis, the single axis zoom component 715 may determine that a single axis zoom on the vertical axis is requested and may instruct the display component 705 to display a graphical representation of the data with the range associated with the defined region, and a domain that is unchanged from the current graphical representation.

In some implementations, the single axis zoom component 715 may determine that a single axis zoom is requested if an indication of a single axis zoom has been received by the user interface component 710. For example, a user may have actuated a key associated with the singe axis zoom function or may have provided a mouse or finger gesture associated with the singe axis zoom function.

Figure 8:
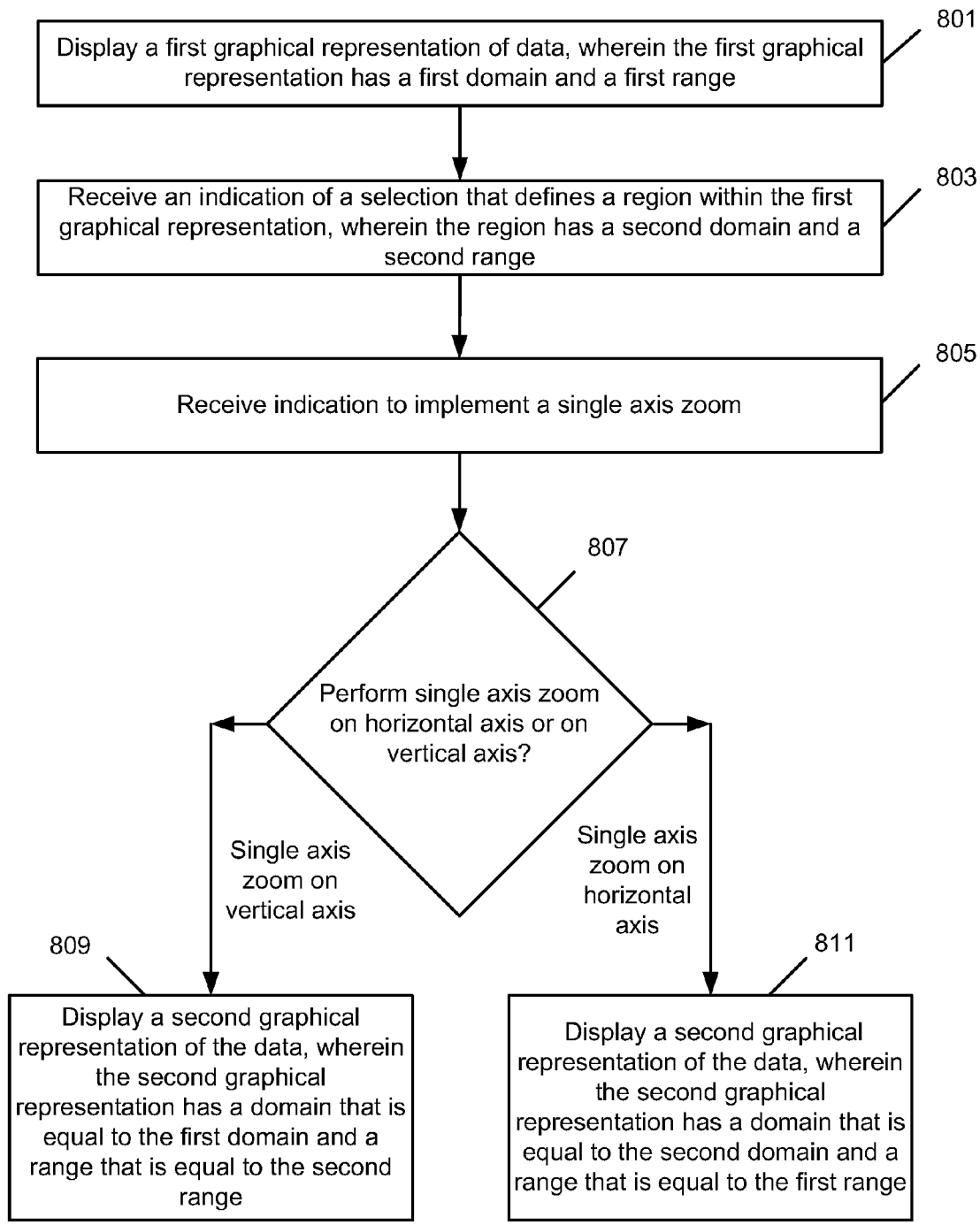
FIG. 8 is an operational flow of an implementation of an exemplary process for providing single axis zoom functionality.

FIG. 8 is an operational flow of an implementation of an exemplary process 800 for providing single axis zoom functionality. The process 800 may be implemented by the system 700 illustrated in FIG. 7, for example.

A first graphical representation of data may be displayed (801). The first graphical representation of data may have a first domain and first range. The data may be video data, image data, or any other type of data that may be graphically represented. In some implementations, the first graphical representation may include a horizontal axis and a vertical axis. The first graphical representation may be displayed by the display component 705 of the system 700, for example.

An indication of a selection may be received (803). The indication of a selection may be received from a user and may define a region within the first graphical representation. For example, the indication of a selection may be a marquee box. The indication of a selection may include a second domain and a second range. The indication of a selection may be received by the user interface component 710 of the system 700, for example.

An indication to implement either a horizontal or vertical single axis zoom may be received (805). The indication to implement may be received from a user by the user interface component 710, for example. In some implementations, the indication to implement may be a key actuation. For example, a user may press the "h" key indicating that a horizontal single axis zoom is desired. Other types of input may be used to indicate a single axis zoom, such as a mouse gesture or voice input, for example.

A determination is made as to whether to implement a horizontal or vertical single axis zoom (807). The determination may be made by the single axis zoom component 715 of the system 700. In some implementations, the determination may be made based on the received indication to implement a single axis zoom. If it is determined to implement a vertical single axis zoom, the process may continue at 809. If it is determined to implement a horizontal single axis zoom, the process may continue at 811.

If it is determined to implement a vertical single axis zoom, a second graphical representation of the data may be displayed (809). The second graphical representation may have a domain that is equal to the first domain, and a range that is equal to the second range. The second graphical representation may be displayed by the display component 705 of the system 700, for example.

If it is determined to implement a horizontal single axis zoom, a second graphical representation of the data may be displayed (811). The second graphical representation may have a domain that is equal to the second domain, and a range that is equal to the first range. The second graphical representation may be displayed by the display component 705 of the system 700, for example.

Figure 9:
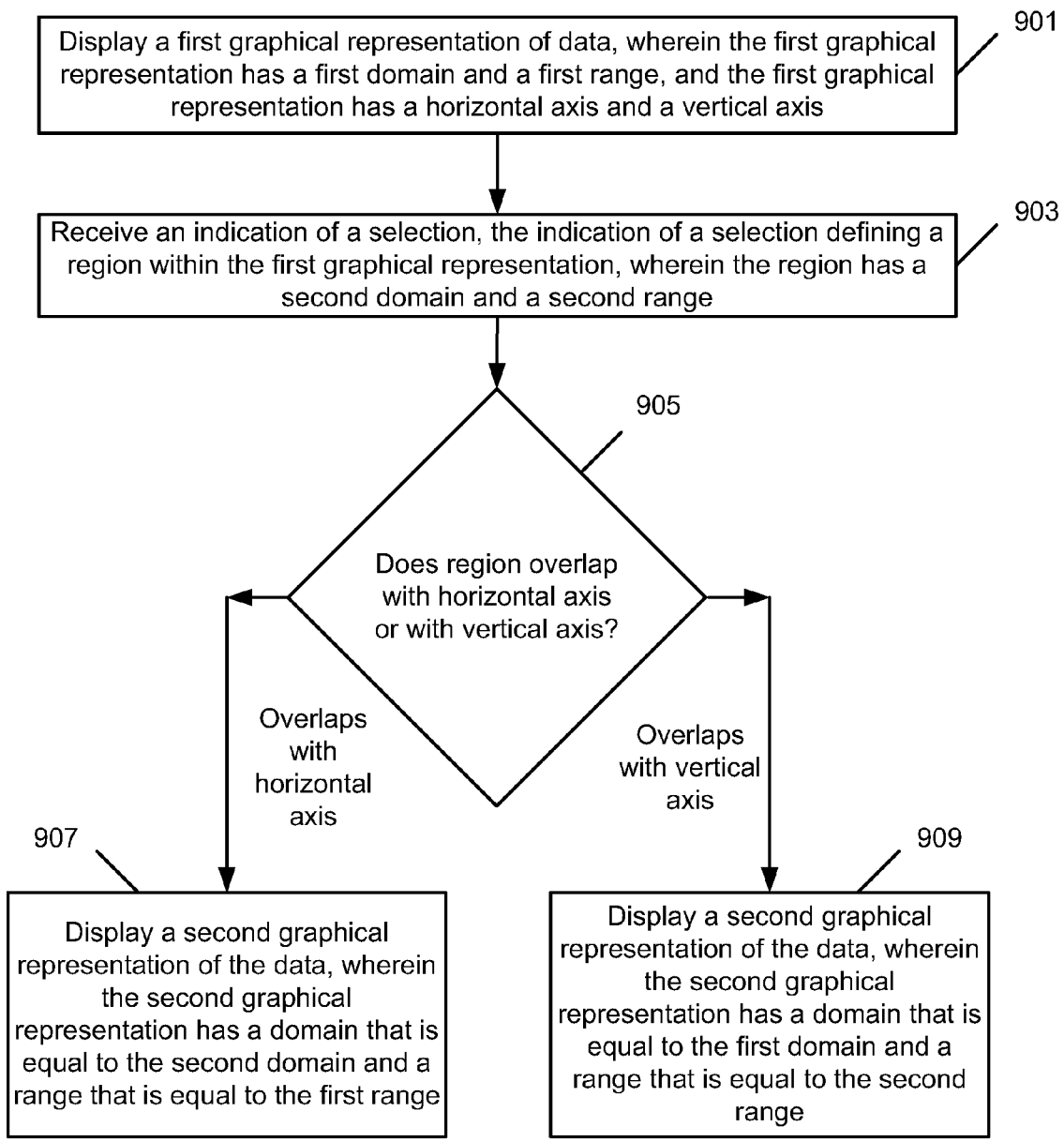
FIG. 9 is an operational flow of another implementation of an exemplary process for providing single axis zoom functionality.

FIG. 9 is an operational flow of an implementation of a process 900 for providing single axis zoom functionality. The process 900 may be implemented by the system 700 illustrated in FIG. 7, for example.

A first graphical representation of data may be displayed (901). The first graphical representation may have a first domain and a first range. The first graphical representation may include horizontal and vertical axes. The first graphical representation may be displayed by the display component 705 of the system 700, for example.

An indication of a selection may be received (903). The received indication of a selection may define a region within the first graphical representation. The defined region may have a second domain and a second range. The indication of a selection may be received by the user interface component 710 of the system 700, for example.

A determination may be made as to whether the defined region overlaps with the horizontal axis or the vertical axis (905). The determination may be made by the single axis zoom component 715, for example. If it is determined that the defined region overlaps with the horizontal axis, a single axis zoom of the horizontal axis may be performed (907). If it is determined that the defined region overlaps with the vertical axis, a single axis zoom of the vertical axis may be performed (909).

If it is determined that the defined region overlaps with the horizontal axis, then a second graphical representation of the data may be displayed (907). The second graphical representation may have a domain that is equal to the second domain and a range that is equal to the first range. The second graphical representation may be displayed by the display component 705 of the system 700, for example.

If it is determined that the defined region overlaps with the vertical axis, then a second graphical representation of the data may be displayed (909). The second graphical representation may have a domain that is equal to the first domain and a range that is equal to the second range. The second graphical representation may be displayed by the display component 705 of the system 700, for example.

Figure 10:
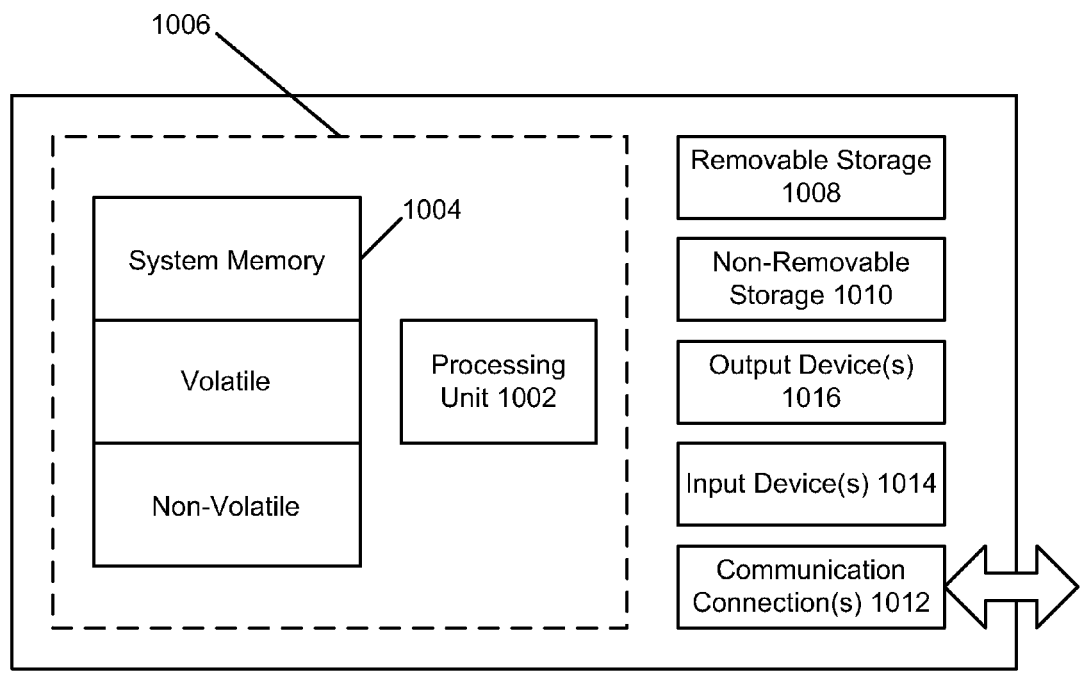
FIG. 10 is a block diagram of an example computing environment that may be used in conjunction with example embodiments and aspects.

FIG. 10 is a block diagram of an example computing environment that may be used in conjunction with example embodiments and aspects. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by device 1000 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 1000. Any such computer storage media may be part of computing device 1000.

Computing device 1000 may contain communications connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

Computing device 1000 may be one of a plurality of computing devices 1000 inter-connected by a network. As may be appreciated, the network may be any appropriate network, each computing device 1000 may be connected thereto by way of communication connection(s) 1012 in any appropriate manner, and each computing device 1000 may communicate with one or more of the other computing devices 1000 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for displaying data, comprising:
    displaying a first graphical representation of data by a display component of a computing device, wherein the first graphical representation has a first domain and a first range;
    receiving an indication of a selection at a user interface component of the computing device, the indication of a selection defining a region within the first graphical representation, wherein the region has a second domain and a second range;
    determining whether to implement either a horizontal single axis zoom or a vertical single axis zoom based on a received indication to implement, wherein the indication to implement comprises one or more of a keystroke, a gesture, or a voice input;
    indicating that either the horizontal single axis zoom or the vertical single axis zoom is selected by replacing a first graphical representation of a user interface element associated with the defined region by displaying a second graphical representation of the user interface element that indicates which of the horizontal single axis zoom or the vertical single axis zoom is selected; and
    implementing the horizontal single axis zoom or the vertical single axis zoom on the graphical representation of the data.

2. The method of claim 1, wherein implementing the vertical single axis zoom comprises displaying a second graphical representation of the data by the display component of the computing device, wherein the second graphical representation has a domain that is equal to the first domain and a range that is equal to the second range.

3. The method of claim 1, wherein implementing the horizontal single axis zoom comprises displaying a second graphical representation of the data by the display component of the computing device, wherein the second graphical representation has a domain that is equal to the second domain and a range that is equal to the first range.

4. The method of claim 1, wherein the indication of the selection comprises an indication of a marquee selection.

5. The method of claim 1, wherein the second graphical representation of the user interface element that indicates which of the horizontal single axis zoom or the vertical single axis zoom is selected comprises a calipers graphic.

6. A method for displaying data, comprising:
    displaying a first graphical representation of data and a first graphical representation of a user interface element by a display component of a computing device, wherein the first graphical representation of data has a first domain and a first range;
    receiving an indication of a selection and an indication to implement at a user interface component of the computing device, the indication of a selection defining a region within the first graphical representation of data, wherein the region has a second domain and a second range;
    determining which of either a horizontal single axis zoom or a vertical single axis zoom is selected based on the indication to implement, wherein the indication to implement comprises one or more of a keystroke, a gesture, or a voice input; and
    replacing the first graphical representation of the user interface element associated with the defined region by displaying a second graphical representation of the user interface element that indicates which of either the horizontal single axis zoom or the vertical single axis zoom is selected.

7. The method of claim 6, further comprising displays displaying the indication of selection on the first graphical representation of the data.

8. The system method of claim 6, further comprising if it is determined that the vertical single axis zoom is selected, displaying a second graphical representation of the data, wherein the second graphical representation has a domain that is equal to the first domain and a range that is equal to the second range.

9. The method of claim 6, further comprising if it is determined that the horizontal single axis zoom is selected, displaying a second graphical representation of the data, wherein the second graphical representation has a domain that is equal to the second domain, and a range that is equal to the first range.

10. The method of claim 6, wherein the indication of a selection is an indication of a marquee selection.

11. The method of claim 6, wherein the second graphical representation of the user interface element comprises a calipers graphic.

* * * * *